United States Patent [19]

Fleming

[11] 4,411,256
[45] Oct. 25, 1983

[54] SOLAR COLLECTOR

[76] Inventor: Philip J. Fleming, Rte. 3, Box 162, Quincy, Fla. 32351

[21] Appl. No.: 358,563

[22] Filed: Mar. 16, 1982

[51] Int. Cl.³ .............................................. F24J 3/02
[52] U.S. Cl. ................................. 126/441; 126/447; 126/448; 126/449; 126/450
[58] Field of Search ............... 126/438, 441, 446, 447, 126/448, 449, 450

[56] References Cited

U.S. PATENT DOCUMENTS

| Re. 30,136 | 11/1979 | Schriefer, Jr. | 126/441 |
|---|---|---|---|
| 3,985,117 | 10/1976 | Sallen | 126/447 |
| 4,019,496 | 4/1977 | Cummings | 126/441 |
| 4,072,142 | 2/1978 | Lof | 126/442 |
| 4,073,282 | 2/1978 | Schriefer, Jr. | 126/441 |
| 4,083,358 | 4/1978 | Scott | 126/448 |
| 4,151,829 | 5/1979 | Wilson | 126/442 |
| 4,159,708 | 7/1979 | Pyle | 126/450 |
| 4,191,170 | 3/1980 | Carrell | 126/449 |
| 4,210,129 | 7/1980 | O'Hanlon | 126/447 |
| 4,211,213 | 7/1980 | Nissen et al. | 126/452 |
| 4,220,139 | 9/1980 | Ramsden | 126/441 X |
| 4,220,140 | 9/1980 | Francia | 126/446 |
| 4,221,209 | 9/1980 | Thorne | 126/441 |
| 4,244,354 | 1/1981 | Williams | 126/448 |
| 4,280,328 | 7/1981 | Falconer | 126/443 X |
| 4,297,989 | 11/1981 | Wozny et al. | 126/441 |

FOREIGN PATENT DOCUMENTS

| 9472 | 4/1980 | European Pat. Off. | 126/450 |
|---|---|---|---|
| 2407438 | 6/1979 | France | 126/450 |

Primary Examiner—Samuel Scott
Assistant Examiner—Margaret A. Focarino
Attorney, Agent, or Firm—Dowell & Dowell

[57] ABSTRACT

Apparatus including an insulated housing having multiple generally parallel layers of fluid carriers with laterally extending portions which are arranged in a staggered serpentine manner. A first screen extends back and forth between the laterally extending portions of the carriers and a second screen is positioned intermediate the upper fluid carrier and a transparent cover on the housing in such a manner that the first and second screens diffuse the light and heat, absorb the heat and transfer the heat to the fluid carriers to heat the fluid therein.

7 Claims, 5 Drawing Figures

U.S. Patent    Oct. 25, 1983    Sheet 1 of 2    4,411,256
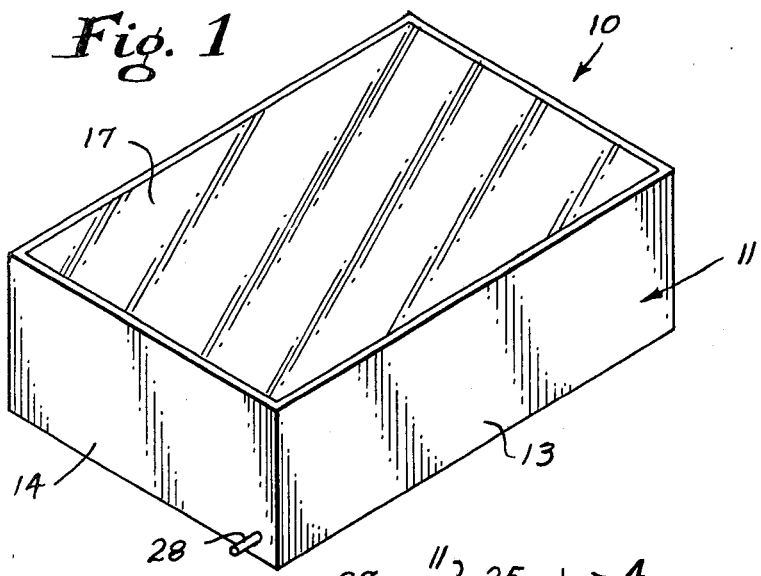
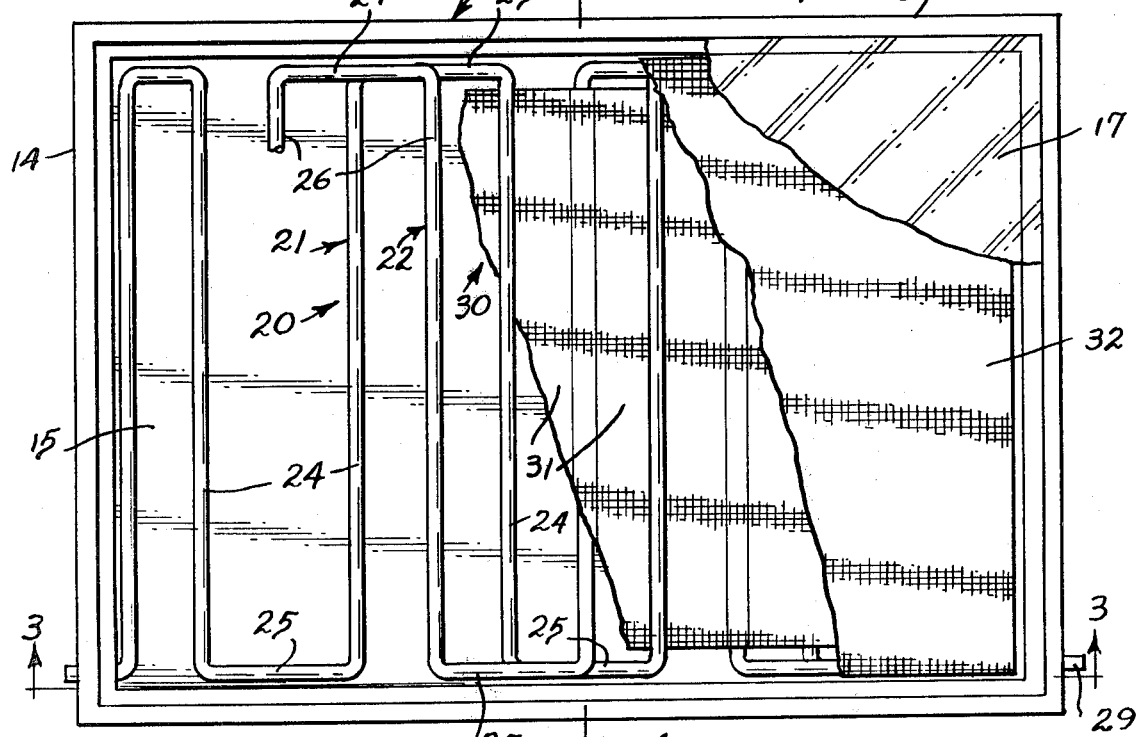
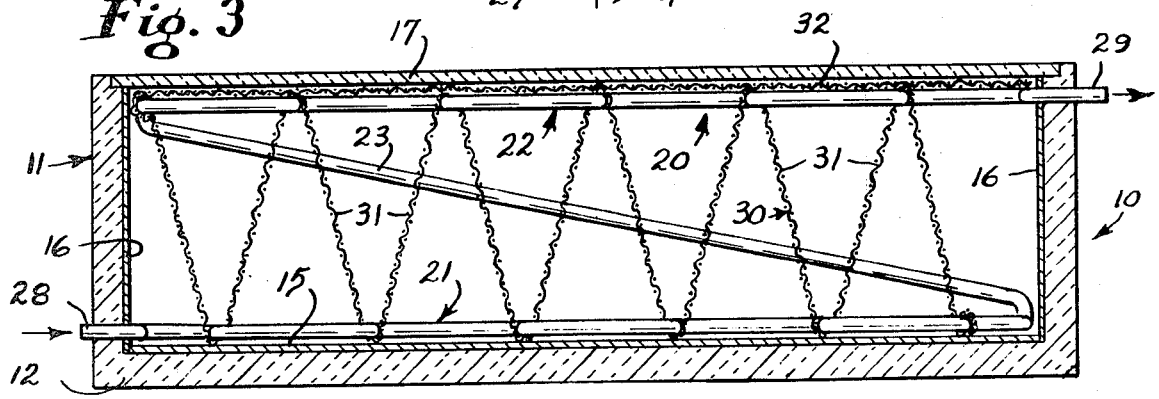

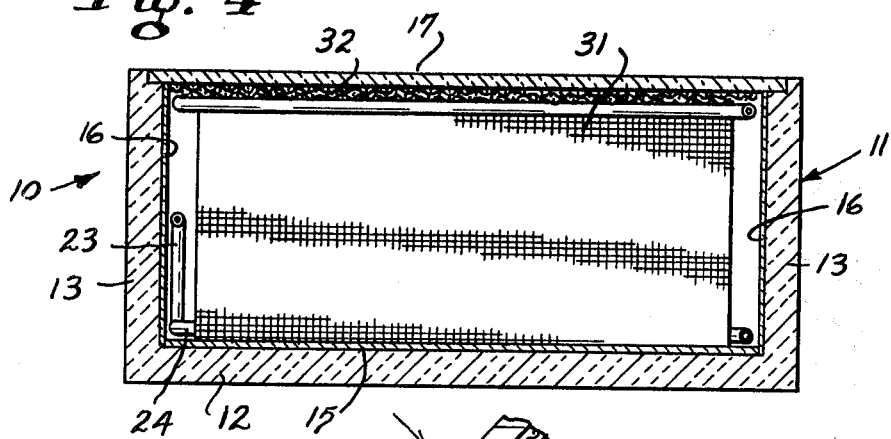
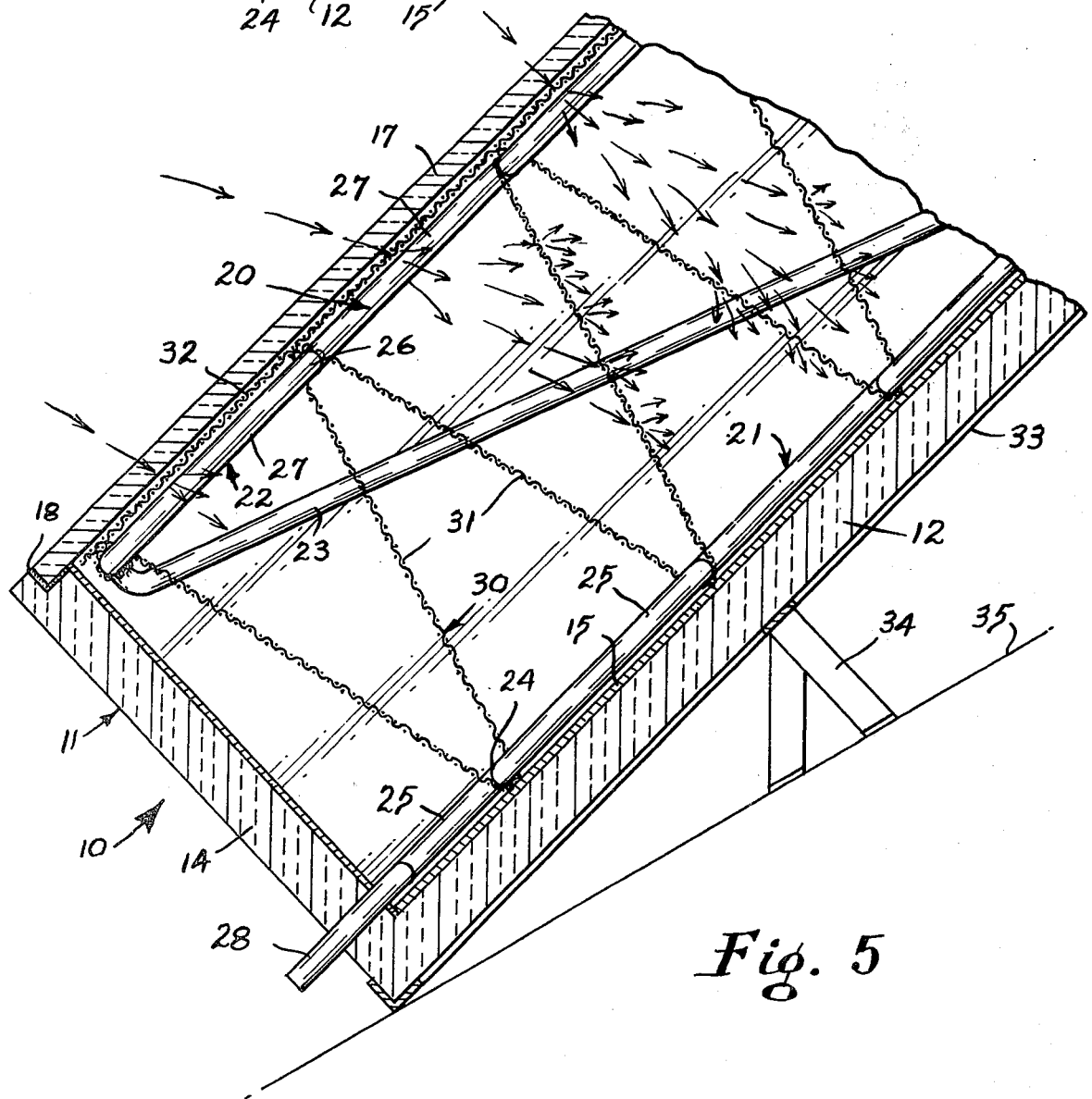

SOLAR COLLECTOR

TECHNICAL FIELD

The present invention is directed generally to apparatus for obtaining energy from the sun and is directed specifically to a solar collector which receives heat from the sun, absorbs substantially all of such heat, and transfers the heat to a liquid which is piped to a remote location where the heat is used or stored for future use.

BACKGROUND ART

Heretofore, many efforts have been made to utilize energy in the form of heat from the sun to supply heat to buildings as well as to heat water for commercial or domestic use. Many of these devices have included a solar collector which receives the heat from the sun and heats a flowing supply of water or other fluid after which the fluid is transferred to a storage area. Many of these collectors have included an insulated housing having a transparent cover and a plurality of fluid containing pipes having a dark or black color which absorbs the heat and transfers such heat to the fluid within the pipes. The heated fluid is then pumped or otherwise moved to a heat storage area or to a location for use. Some prior art structures have used baffles and the like to either direct the heat to the pipes directly or absorb the heat and transmit the heat to the pipes by conduction or radiation.

Some examples of the prior art are disclosed by the U.S. Pat. Nos. to Cummings 4,019,496; Schriefer 4,073,282 and Re. 30,136; Wilson 4,151,829; O'Hanlon 4,210,129; Ramsden 4,220,139; Francia 4,220,140; Lof 4,072,142; Thorne 4,221,209; Williams 4,244,354; and Falconer 4,280,328.

DISCLOSURE OF THE INVENTION

The present invention is embodied in a solar heat collector which includes an insulated container or housing with a bottom wall, side walls and end walls defining a window opening. A transparent window pane or cover which is transmissive to solar energy is mounted on the housing in air tight relationship so that ambient air cannot enter the housing. Within the housing, a pair of spaced generally parallel layers of pipes, tubing or other fluid carriers are provided with each layer having a plurality of laterally disposed portions which extend substantially from side to side of the housing and are alternately connected together by a plurality of longitudinally disposed portions which are located contiguous to the side walls of the housing and define a serpentine path.

The housing ordinarily is positioned at a fixed angle to a horizontal plane when in use and the lower layer has an inlet at the lower end and a discharge at the upper end. The discharge of the lower layer is connected by a riser to the lower inlet end of the upper layer and the upper end of the upper layer has a discharge outlet which may be connected to a use location or to a heat storage area. The laterally disposed portions of the lower layer are in staggered offset relationship with the corresponding portions of the upper layer. A first screen is secured to one of the laterally extending portions and extends back and forth, seriatim, between the laterally extending portions of the upper and lower layers. A second screen is positioned across the top of the upper layer between the upper layer and the transparent window pane or cover.

It is an object of the invention to provide a solar collector including a hollow housing with a transparent upper wall having at least two spaced generally parallel layers of a fluid carrier with each layer having a plurality of laterally extending portions in staggered offset relationship with each other and at least one screen extending back and forth, seriatim, between such lateral portions.

BRIEF DESCRIPTION OF THE DRAWINGS

FIG. 1 is a perspective view of the solar collector.

FIG. 2 is an enlarged top plan view of the collector with portions broken away for clarity.

FIG. 3 is a sectional view taken on the line 3—3 of FIG. 2.

FIG. 4 is a sectional view taken on the line 4—4 of FIG. 2.

FIG. 5 is an enlarged fragmentary sectional view of one end of the collector in use.

DESCRIPTION OF THE PREFERRED EMBODIMENT

With reference to the drawings, a solar collector 10 is provided which is to be used with a conventional solar heat recovery system (not shown). The collector includes a container or housing 11 having a bottom wall 12, side walls 13 and end walls 14 constructed of heat insulating material and defining a window opening. The inner face of the bottom wall is covered by a sheet 15 of heat absorbing material such as sheet metal, thermoplastic material of the like that has a black heat absorbing coating applied thereto or is manufactured of black heat absorbing material. The inner face of each of the side walls 13 and end walls 14 is covered by a sheet or coating 16 of a highly reflective material such as aluminum foil or the like.

The open side of the housing 11 is closed by a transparent window pane defining a cover or top 17 which is constructed of leaded glass, thermoplastic material, or other material which is transmissive to solar energy. Such cover or top is sealed in air tight relationship with the housing 11 in any desired manner such as an insulating adhesive 18 (FIG. 5) or the like to prevent the ingress of ambient air and egress of heated air when the collector is in use.

Within the housing, a fluid carrier 20 is provided which is constructed of pipes, tubing or an equivalent structure of metal or thermoplastic material which is colored, coated or manufactured of a black material which absorbs solar energy in the form of heat. Such fluid carrier includes a first or lower layer 21 and a second or upper layer 22 which are arranged in spaced generally parallel relationship with each other and opposite ends of such layers are connected together by a riser 23. The lower layer 21 includes a plurality of laterally extending portions 24 which are connected alternately at opposite ends by longitudinally extending portions 25 located contiguous to the side walls 13 in a serpentine manner. The laterally extending portions are substantially equally spaced along the length of the lower layer and are nominally a predetermined distance apart, for example 12 to 15 inches (30.48 to 37.10 cm) apart, except for the spacing between the end pipes and the pipes adjacent thereto.

The upper layer 22 includes a plurality of laterally extending portions 26 which are alternately connected together at opposite ends by longitudinally extending portions 27 located contiguous to the side walls 13 in a serpentine manner. The laterally extending portions are substantially equally spaced along the length of the upper layer and such spacing corresponds generally to the spacing of the laterally extending portions of the lower layer 21. However, the laterally extending portions of the upper layer are in staggered offset relationship with the laterally extending inner portions of the lower layer as shown in FIGS. 2, 3, and 5.

The lower end of the lower layer 21 is provided with an inlet 28 which is connected to a source of fluid and the upper end of the upper layer 22 is provided with an outlet 29 which is connected to a storage tank or a device which uses the heated fluid directly. The discharge or upper end of the lower layer is connected to the lower or inlet end of the upper layer by the riser 23.

With particular reference to FIG. 3, a first screen 30 is attached to one of the laterally extending portions 24 and extends back and forth, seriatim, over the upper laterally extending portions 26 and under the lower laterally extending portions 24 to form a continuous series of deep V-shaped open baffles 31. Such screen preferably has a width extending substantially from side to side of the laterally extending portions and ordinarily has a mesh in the range of one-sixteenth inch (1.59 mm) to one-half inch (12.7 mm). The screen 30 may be constructed of any desired heat absorbing and conducting material and should have a black surface to enhance its heat absorbing quality.

Instead of providing a continuous length of screen as just described, it is contemplated that a plurality of panels of screening material could be provided with opposite sides of each panel being attached to the laterally extending portions of the upper and lower layers of welding, solder, adhesives or the like.

A second screen 32, which is flat and extends substantially from side to side and from end to end of the inner cavity of the housing 11, is placed across the first screen 30 and is supported by the upper layer 22 adjacent to the transparent cover to top 17. Normally, the second screen has the same mesh size and is constructed of the same material as the first screen, however, it is contemplated that the mesh size of the first and second screens may vary relative to each other.

With particular reference to FIG. 5, the solar collector 10 normally is positioned at a fixed angle to a longitudinal plane which is calculated to receive the most direct sunlight throughout the year. Ideally, the length of the collector is positioned along a North-South line so that the laterally extending portions 24 and 26 are disposed along an East-West line. In the area of Tallahassee, Fla., which is located at approximately 30° North latitude, the angle to a horizontal plane is preferably approximately 42°. In order to support the collector 10 at the desired angle, a frame 33 is provided having legs 34 which may be attached to a roof 35 or the like. It is noted that the collector 10 may be mounted on a flat roof or other structure or the earth and, therefore, the mounting frame may vary to suit each installation.

The collector 10 may be of any desired size. However, a collector having a housing with a cavity 76 inches (193.04 cm) long, 46 inches (116.84 cm) wide and 24 inches (60.96 cm) high has been found satisfactory. The fluid carrier 20 preferably has an inner diameter of one-half inch (12.70 mm) to three quarters inch (19.05 mm) and the upper layer 22 is spaced from the lower layer 21 by approximately 22 inches (55.88 cm).

In the operation of the device, relatively cool fluid such as water or other liquid or a gas such as air is introduced into the inlet 28 and is caused to flow upwardly along the serpentine lower layer 21 until it is discharged through the riser 23 to the inlet end of the upper layer 22 where the fluid continues to flow upwardly to the discharge outlet 29. The collector may be used with either a forced system using a pump or a thermosiphon system. As the fluid is flowing through the carrier 20, the sun's rays pass through the transparent cover or top 17 and first encounter the second or flat screen 32. Some of the heat from the rays is absorbed by the flat screen while the remainder passes therethrough and is diffused and dispersed so that it impinges on the first screen 30 or the fluid carrier 20. The second screen absorbs additional heat while the remaining heat passes therethrough to the bottom sheet 15 or portions of the fluid carrier where the remainder of the heat is absorbed. The heat which is absorbed by the second and first screens is transferred to the fluid carrier by conduction or is radiated through the air within the housing to such carrier.

Desirably, the spacing between the upper and lower layers and the spacing of the laterally extending portions of each of the layers is such that the upper laterally extending portions do not cast a shadow which falls on the lower laterally extending portions when the collector is mounted at the required angle for use. This applies throughout the length of the year regardless of the tilt of the earth at different seasons.

Due to the size of the cavity of the housing 11, the length of the time required for the fluid to flow through the carrier 20, and the configuration and total area of the heat absorbing material a substantially greater portion of the energy entering the collector is transferred to the fluid than is transferred in conventional collectors. Accordingly, the efficiency of the solar collector of the present invention is substantially increased over other collectors and particularly flat plate collectors known to me.

What is claimed is:

1. A solar collector comprising a housing having an insulated bottom wall, and insulated side and end walls defining a window opening, the inner faces of said side and end walls being highly reflective, the inner face of said bottom wall having a nonreflecting heat absorbing surface, the inner faces of said side walls having a height approximately one-half the width of said bottom wall, fluid carrier means disposed within said housing, said fluid carrier means including a first layer positioned adjacent to said bottom wall and a second layer positioned below the window opening and in a plane generally parallel with said first layer, said first layer of said carrier having spaced generally parallel laterally extending portions that extend between said side walls and are connected in serpentine fashion by alternating longitudinal portions located adjacent to said side walls, said second layer of said carrier having spaced parallel laterally extending portions that extend between said side walls and are connected in serpentine fashion by alternating longitudinal portions located adjacent to said side walls, the laterally extending portions of the second layer being in staggered offset relationship with the spacing of said laterally extending portions of said first layer, riser means connecting the discharge end of said first layer to the inlet end of such second layer, said fluid carrier having nonreflecting heat absorbing surfaces, screen means connecting said lower laterally extending portions to said upper laterally extending portions seriatim and forming an interconnected series of open V-shaped baffles, said screen means having nonreflecting heat absorbing surfaces, and a transparent window pane sealingly attached to said housing over said window opening.

2. The invention of claim 1, including a second screen means extending over said second layer and beneath said transparent window pane.

3. The invention of claim 1, in which the spacing between the parallel laterally extending portions of each layer approximates one half the height of said side walls.

4. The invention of claim 1, in which said screen means has a mesh in the range of 1/16 to ½ inch.

5. A solar collector comprising a housing having a bottom wall, and side and end walls, said side and end walls defining a window opening, said walls having substantial insulation, the inner faces of said side and end walls being highly reflective, said bottom wall having an inner portion with a nonreflecting heat absorbing surface, the inner faces of said side walls having a height approximately one half the width of said inner portion of such bottom wall, said bottom and side walls having a length commensurate with the performance requirement of the collector, liquid piping means disposed within said housing, said piping means including a first layer positioned on the inner portion of said bottom wall and a second layer of pipes positioned just below the window opening and in a plane generally parallel to the plane of said first layer of pipes, said first layer of pipes having spaced parallel laterally extending lengths that extend between the sides of the container and are connected in serpentine fashion by lengths extending along the sides, said second layer of pipes having spaced parallel laterally extending lengths that extend between the sides of the container and are connected in serpentine fashion by lengths extending along the sides, the laterally extending lengths of the second layer being so spaced from the end walls in comparison with the spacing of said first layer of laterally extending lengths that a vertical projection of said second layer would be positioned intermediate said laterally extending lengths of said first layer, and riser means connecting one end of said first layer of pipes to one end of such second layer, said pipes having nonreflecting heat absorbing surfaces, and screen means passing under a lower laterally extending pipe and then upwardly and over an upper laterally extending pipe seriatim and forming an interconnected series of open Vees, said screen means having nonreflecting heat absorbing surfaces, and a transparent window covering mounted over said window opening.

6. A solar collector comprising a housing having a bottom wall, and side and end walls, said side and end walls defining a window opening, said walls having substantial insulation, the inner faces of said side and end walls being highly reflective, said bottom wall having an inner nonreflecting heat absorbing surface, said bottom and side walls having a length commensurate with the performance requirement of the collector, liquid piping means disposed within said container, said piping means including a first layer of pipes positioned on said bottom wall and a second layer of pipes positioned below the window opening and in a plane generally parallel to the plane of said first layer of pipes, said first layer of pipes having spaced lengths between the sides of the housing and connected in serpentine fashion, said second layer of pipes having spaced lengths between the sides of the container and connected in serpentine fashion, the lengths of the second layer being so positioned in comparison with the positioning of said first layer of lengths that a solar shadow from said lengths of the second layer during normal operation does not substantially cover the lengths of the second layer, pipe means connecting one end of said first layer of pipes to one end of said second layer of pipes, said pipes having nonreflecting heat absorbing surfaces, screen means engaging and extending between the lengths of the first and second layers length, said screen means having nonreflecting heat absorbing surfaces, and a transparent window covering mounted on said window opening.

7. A solar collector comprising a housing having a bottom wall, side and end walls, said side and end walls defining a window opening, said walls having substantial insulation, the inner faces of said side and end walls being highly reflective, said bottom wall having an inner nonreflecting heat absorbing surface, said side walls having substantial height but less than the width of said bottom wall, liquid piping means disposed within said container, said piping means including series connected spaced lengths of pipes at upper and lower levels within the housing, said lengths being so positioned that the solar shadows from the lengths at the upper levels during normal operation do not substantially cover the lengths at the lower levels, said pipes having nonreflecting heat absorbing surfaces, screen means engaging and extending between the lengths of the upper and lower levels forming an open baffle, said screen means having nonreflecting heat absorbing surfaces, and a transparent window covering mounted on said container and over said window opening.

* * * * *